United States Patent Office 3,370,077
Patented Feb. 20, 1968

3,370,077
POLYOXYALKYLENE DIISOCYANATES
Gordon E. Hartzell, Midland, Mich., assignor to The Dow Chemical Company, Midland, Mich., a corporation of Delaware
No Drawing. Filed June 12, 1964, Ser. No. 374,830
4 Claims. (Cl. 260—453)

ABSTRACT OF THE DISCLOSURE

Bis(isocyanatoalkyl) ethers of polyoxyalkylene glycols are prepared by reacting a corresponding dichloride with a metal cyanate or, more conveniently, by reacting a corresponding diamine with phosgene. These normally liquid polyoxyalkylene diisocyanates are intermediates for making polyurethanes and are also crosslinking and bonding agents. Compounds based on polypropylene glycol of at least 400 molecular weight are of particular interest.

---

This invention relates to new chemical compounds. It relates specifically to new organic isocyanates which have the general formula $$OCN-C_yH_{2y}O(C_xH_{2x}O)_nC_yH_{2y}-NCO$$

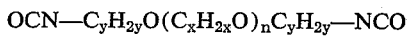

where $x$ and $y$ are integers from two to four and $n$ is a number from 2 to about 100. The groups $C_yH_{2y}$ and $C_xH_{2x}$, therefore, represent lower alkylene radicals such as ethylene, propylene, trimethylene, 1,2-butylene, 2,3-butylene, and tetramethylene.

These compounds can be made by any of the known general methods for making organic isocyanates for example, by the reaction of the corresponding dichloride with a metal isocyanate. A more convenient method involves the reaction of phosgene with a polyoxyalkylenediamine. Such amines are available as the products of direct ammoniation of a polyoxyalkylene glycol or they may be obtained by other means such as the reduction of a bis(cyanoalkyl) ether. A convenient means for making bis(3-aminopropyl) ethers is by way of cyanoethylation of polyglycols and subsequent reduction of the cyano groups.

These new compounds are basically bis(isocyanatoalkyl) ethers of polyoxyalkylene glycols and the polyoxyalkylene chain which forms the nucleus of this family of compounds may be composed of oxyalkylene groups of the same number or of different numbers of carbon atoms within the limits set forth in the general formula above. For example, these polyoxyalkylene chains may be derived from polyglycols obtained by polymerization of a single species of alkylene oxide, by copolymerization of two or more mixed alkylene oxides to obtain chains composed of different oxyalkylene units in random order, or by so-called block polymerization where an alkylene oxide is polymerized using as a starter a polyglycol derived from another alkylene oxide. The symbol $x$ in the above formula can, therefore, represent one, two, or three integers within the same oxyalkylene chain. Similarly, the symbol $y$ can represent two different integers within one molecule although compounds wherein $y$ represents a single number are more easily prepared. Compounds wherein $x$ and $y$ are three and $n$ is 10–40 are of particular interest.

These polyoxyalkylene diisocyanates are ordinarily viscous liquids at normal room temperature. Because of their structure and molecular weight, they have very low vapor pressures as compared to known aliphatic isocyanates. They have low toxicity and cause only slight irritation on contact with the skin. Since the primary utilities of these new compounds are as intermediates for making polyurethanes and as crosslinking and bonding agents, their properties are of particular advantage in handling and processing operations.

Example 1

A solution of 200 g. of the bis(3-aminopropyl) ether of polyoxypropylene glycol of 2000 average molecular weight in a liter of xylene was saturated at room temperature with dry HCl. The solution was heated to 125° C. and maintained at this temperature while 73.5 g. of phosgene was sparged in over a period of 1.1 hours. After removal of the xylene by distillation under reduced pressure, 203 g. of the bis(3-isocyanatopropyl) ether of the polyglycol remained as an amber colored liquid. This material was found by standard isocyanate analytical methods to contain 0.68 milliequivalent of isocyanate group per gram.

Example 2

In the manner described above, 97.0 g. of phosgene was reacted with an HCl-saturated solution in xylene of 64.0 g. of the bis(3-aminopropyl) ether of a polyoxypropylene glycol of 400 average molecular weight. The bis(3-isocyanatopropyl) ether of the polyglycol was obtained as a light brown oil weighing 68.9 g. This product contained 2.62 milliequivalents of isocyanate group per gram.

Example 3

A solution of 350 g. of the bis(3-aminopropyl) ether of polyoxypropylene glycol of about 1200 molecular weight in 1750 ml. of dry xylene was saturated with dry hydrogen chloride at room temperature. While maintaining the temperature at 125° C., 206 g. of phosgene was sparged into the reaction mixture over a period of 3.5 hours. The temperature of the reaction mixture was held at 125° C. for an additional hour before cooling to room temperature. Nitrogen was then bubbled through the reaction mixture for thirty minutes. The xylene was removed by distillation under reduced pressure, leaving 364 g. of the bis(3-isocyanatopropyl) ether of the polyoxypropylene glycol as a light amber oil. This polyether diisocyanate contained 1.16 milliequivalents of isocyanate group per gram and had an average molecular weight of 1700–1800.

Example 4

By the foregoing procedure, 155 g. of phosgene was reacted with an HCl-saturated solution in a liter of xylene of 200 g. of the bis(aminopropyl) ether of a polyoxypropylene glycol, the ether having an average molecular weight of 1000. After removal of HCl and xylene as before, 208 g. of the corresponding bis(isocyanatopropyl) ether was obtained as a brown liquid. The product contained 1.35 milliequivalents of isocyanate group per gram.

In the same way as shown above, the bis(isocyanatoalkyl) ethers of other polyalkylene glycols are prepared. For example, the bis(isocyanatoethyl) ether of polyethylene glycol, the bis(isocyanatopropyl) ether of polybutylene glycol, and the bis(isocyanatobutyl) ether of polypropylene glycol are obtained as materials having physical properties similar to the properties of the corresponding parent polyglycols. Similarly, there are obtained bis(isocyanato lower alkyl) ethers of mixed polyglycols such as result from copolymerization of mixed ethylene and propylene oxides, the addition of a butylene oxide to a polyethylene glycol, or the addition of propylene oxide to a polybutylene glycol.

These new polyoxyalkylene diisocyanates are useful in preparing polyurethanes and polyureas of novel structure derived from their reaction with difunctional compounds such as polyoxyalkylene glycols, other aliphatic and aromatic polyols, aliphatic and aromatic diamines, and other such compounds having two or more active hydrogen groups. Representative preparations are shown in the following examples.

*Example 5*

A quantity of 61.7 g. of the polyether diisocyanate product of Example 3 which had been stirred for ten minutes at 100° C. under vacuum of 1-2 mm. Hg was mixed with 8.4 g. of molten 4,4'-methylene-bis(2-chloroaniline) at 100° C. for 3 minutes before pouring the mixture into a steel mold. The mixture was cured for 4 hours at 100° C. to produce a flexible and rubber-like elastomer having the following properties: Shore A hardness 24, tensile strength 131 lbs./sq. in., 250 percent elongation at break.

*Example 6*

A mixture of 52.4 g. of the diisocyanate product of Example 3, 12.0 g. of polyoxypropylene glycol of 1200 molecular weight, 3.0 g. of tris(hydroxypropyl) glycerol, and 0.34 g. of a 50 percent solution of stannous octoate in dioctyl phthalate was stirred for 15 minutes at 100° C. under reduced pressure of 1-2 mm. Hg. The mixture was then poured into a steel mold and cured for 3 hours at 100° C. The resulting rubbery product had a Shore A hardness of 21, a tensile strength of 70.4 lbs./sq. in., and 120 percent elongation at break. Inclusion of a filler such as carbon black, silica, or talc in the reaction mixture produced elastomers having a Shore A hardness of about 34 and tensile strength up to 191 lbs.

*Example 7*

By the procedure of Examples 5 and 6, 50 g. of the diisocyanate product of Example 1, 2.6 g. of tris(hydroxypropyl) glycerol, and 0.26 g. of stannous octoate were combined and heated at 100° C. to produce an elastomer having properties similar to those of the polymers shown above.

The polyoxyalkylene diisocyanates described herein, beside providing novel starting materials for making polyurethane and polyurea resins having molecular structures and properties different from those of known polymers, are also useful crosslinking or bonding agents capable of reacting with active hydrogen atoms in natural and synthetic polymers such as epoxy resins, cellulose, nitrocellulose, and the like. Plastic materials of improved properties are thereby obtainable. These new diisocyanates are also particularly useful as active components of adhesive mixtures capable of strongly bonding unlike materials such as synthetic textile fibers to elastomers and elastomers to wood or metal.

I claim:

1. A compound of the formula $$OCN-C_yH_{2y}O(C_xH_{2x}O)_nC_yH_{2y}-NCO$$

wherein $x$ and $y$ are integers from 2 to 4 and $n$ is a number from 7 to about 100.

2. The compound of claim 1 wherein $x$ and $y$ are three.

3. The compound of claim 2 wherein $n$ is 10-40.

4. The compound of claim 3 wherein $C_yH_{2y}$ represents the trimethylene radical.

References Cited

UNITED STATES PATENTS 3,044,989 7/1962 Shivers _____ 260—77.5
3,076,788 2/1963 Hoover _____ 260—77.5

CHARLES B. PARKER, *Primary Examiner.*

D. H. TORRENCE, *Assistant Examiner.*